United States Patent Office 2,742,499
Patented Apr. 17, 1956

2,742,499

PREPARATION OF 4,4'-NITROPHENYLBENZOIC ACID BY NITRIC ACID OXIDATION

Richard C. Franklin, Wilmington, Del., assignor to E. I. du Pont de Nemours and Company, Wilmington, Del., a corporation of Delaware No Drawing. Application May 17, 1952,
Serial No. 288,529

4 Claims. (Cl. 260—523)

This invention relates to the manufacture of 4,4'-nitrophenylbenzoic acid from 4-nitrobiphenyl.

The product of the present invention is an intermediate for preparing p,p'-azobiphenyl dicarboxylic acid from which valuable dyes are prepared. As in the case of many dyes, the clarity and shade of the finished dye and textiles dyed therewith are affected by impurities introduced in the preparation of the dye intermediate. The dyes derived from the present invention are not an exception.

Heretofore, several methods have been proposed for making the intermediate for these dyes, including one disclosed in Schroeder 2,567,126. The process of this patent is similar to that of the present invention, but sometimes requires expensive purification steps to obtain dyes of the desired shade and brightness.

It is, therefore, an object of the present invention to provide a relatively simple and economical method of preparing 4,4'-nitrophenylbenzoic acid from which vat dyes may be made having a high degree of clarity and brightness. Another object of the present invention is to provide a method of making this intermediate with a quality which can be readily duplicated and from which dyes having a desired shade can be readily reproduced. Other objects will be apparent as the description of the invention proceeds.

These and other objects are accomplished by acetylating 4-nitrobiphenyl in nitrobenzene with an acyl halide in the presence of aluminum chloride at a temperature of about 40° to 70° C. The aluminum chloride is subsequently removed from the reaction mass, and the 4,4'-acetylnitrobiphenyl is oxidized while still in the nitrobenzene with nitric acid having a strength of from 20% to 70% to yield relatively pure 4,4'-nitrophenylbenzoic acid.

The preferred acyl halide is acetyl chloride, partly because of economic considerations, but acyl chlorides and bromides having from 2 to 5 carbon atoms such as propionyl, butyryl, and valeryl halides are equivalent to acetyl chloride and may be substituted for the latter in the example.

The following example illustrates the preferred embodiment of the invention, but it will be apparent that considerable deviation may be observed without departing from the spirit of the invention.

*Example*

In a 500 ml. flask equipped with a condenser and dropping funnel, 100 parts of 4-nitrobiphenyl and 400 parts of dry nitrobenzene are mixed, and to this is added 130 parts of anhydrous aluminum chloride. After adjusting the temperature to 50° C., a mixture of 65 parts of acetyl chloride and 65 parts of nitrobenzene is added over an 8-hour period at 50° to 55° C. The reaction mixture is heated to 60° to 65° C. and held for 4 hours, and then poured into cold water. The nitrobenzene layer is washed three times with hot dilute mineral acid, separating the two layers by decantation. Without further purification, the nitrobenzene layer is returned to a 500 ml. flask, heated to 110° C. and maintained at this temperature to drive off the excess water. To this solution is then added 211 parts of 60% nitric acid at 105° to 110° C., permitting water to escape through a condenser held at 40° to 90° C. during the course of the reaction. The nitric acid is added gradually over a period of 5 hours, and then the mixture is heated to 115° C. and held 4 hours to complete the oxidation. After cooling to 25° C., the reaction product is filtered from the nitrobenzene-nitric acid mixture. The nitrobenzene cake is then heated to 95° to 100° C. in the presence of somewhat more alkali, such as sodium hydroxide, than is required to neutralize the acid, while removing the nitrobenzene by steam distillation. The resulting solution of 4,4'-nitrophenylbenzoic acid sodium salt is filtered to remove insoluble by-products, and the free acid is isolated by acidification in 77% yield from 4-nitrobiphenyl. The dry product melts at 345° C. The product may also be isolated as the sodium salt by addition of 3% sodium chloride to the above clarified solution.

It will be apparent that the nitrobenzene-aluminum chloride-acetyl chloride complex is used at a temperature at which the reaction is carried out through the complex and not through the individual disassociated molecules, thereby avoiding undesirable side reactions and their complications and leading to the formation of a relatively pure 4,4'-acetylnitrobiphenyl. The complex should be one of an acetyl halide with aluminum chloride and nitrobenzene. The acetyl halide is preferably the acetyl or chloroacetyl halide, particularly the chlorides or bromides.

The solvent medium should contain a major proportion of nitrobenzene, at least enough to form the stable, soluble complex with aluminum chloride.

The process of the present invention is similar to that disclosed in U. S. 2,567,126, up to the oxidation step, and the limitations mentioned in the patent are also applicable to the present invention up to the point indicated.

The oxidation step with nitric acid is preferably carried out after removal of water from the nitrobenzene layer containing the acetyl nitrobiphenyl, by distillation. Preferably also, water is distilled off during the reaction. If desired, part of the nitrobenzene solvent may be removed (by steam or vacuum distillation) before the oxidation step. A convenient temperature for the oxidation step is the atmospheric boiling point of the reaction mass.

The present invention offers considerable advantages over the prior art which are concerned primarily with the purity of the 4,4'-nitrophenylbenzoic acid obtained from the invention. This pure intermediate yields dyes having exceptional clarity and consistency in shade. Heretofore, strong nitric acid, particularly fuming nitric, has been used to oxidize the acetyl group of 4,4'-acetylnitrobiphenyl with the simultaneous nitration forming a dinitrobiphenyl-carboxylic acid, and therefore, it is surprising that the nitric acid of 20% to 70% strength used in the present invention does not likewise produce a dinitro compound rather than a pure mono-nitro carboxylic acid.

It is apparent that many widely different embodiments of this invention may be made without departing from the spirit and scope thereof, and therefore, it is not intended to be limited except as indicated in the appended claims.

I claim:

1. In the process of preparing 4,4'-nitrophenylbenzoic acid in which 4-nitrobiphenyl is acylated in nitrobenzene in the presence of aluminum chloride, the improvement which comprises oxidizing the crude mixture containing the acylated 4,4'-nitrobiphenyl and nitrobenzene with nitric acid of from 20% to 70% strength.

2. The process of preparing 4,4'-nitrophenylbenzoic acid which comprises acylating 4-nitrobiphenyl in nitrobenzene with an acyl halide having from 2 to 5 carbon atoms in the presence of aluminum chloride at a temperature between 40° and 70° C., removing the aluminum chloride from the reaction mass and oxidizing the resulting crude 4,4'-acylnitrobiphenyl in the presence of nitrobenzene with nitric acid having a strength of from 20% to 70%.

3. The process of preparing 4,4'-nitrophenylbenzoic acid which comprises heating a mixture of 4-nitrobiphenyl, an acetyl halide, nitrobenzene and anhydrous aluminum chloride to a temperature between 50° and 65° C., pouring the mixture into cold water, washing the nitrobenzene layer with hot dilute mineral acid, separating the resulting two layers and heating the nitrobenzene layer with 60% nitric acid at about 105° to 115° C., filtering the 4,4'-nitrophenylbenzoic acid, neutralizing with a sodium hydroxide, and recovering the sodium salt of the 4,4'-nitrophenylbenzoic acid.

4. The process of claim 3 in which the acetyl halide is acetyl chloride.

References Cited in the file of this patent

UNITED STATES PATENTS

| 1,488,730 | Beall et al. | Apr. 1, 1924 |
| 2,567,126 | Schroeder | Sept. 4, 1951 |

FOREIGN PATENTS

| 97,063 | France | Dec. 6, 1950 |

OTHER REFERENCES

Richter; The Chemistry of the Carbon Compounds, 3rd English ed., vol. III, pp. 287, 288, 290, 291.